L. Gray,
Shaft Coupling,

Nº 52,162. Patented Jan. 23, 1866.

Witnesses
Josiah W. Ellis
Eb. Williams Jr.

Inventor
Lucien Gray

UNITED STATES PATENT OFFICE.

LYMAN GRAY, OF PITTSBURG, PENNSYLVANIA.

IMPROVED COUPLING FOR SHAFTING.

Specification forming part of Letters Patent No. 52,162, dated January 23, 1866.

*To all whom it may concern:*

Be it known that I, LYMAN GRAY, of the city of Pittsburg, in the county of Allegheny and State of Pennsylvania, have invented a new and useful Improvement in Couplings for Shafting, &c.; and I hereby declare that the following is a full, clear, and exact description thereof, reference being had to the accompanying drawings, forming part of this specification, and to the letters of reference marked thereon.

My invention consists in the application and use of two or more pawls within a metallic sleeve arranged at such an angle to the axis of the shaft or shafts that one end of each pawl presses against and bites into the periphery of the shaft or shafts, so as to prevent their rotation in either direction within the sleeve when in use.

To enable others to understand and make my improvement, I will proceed to describe its construction by reference to the accompanying drawings, wherein—

Figure 1:
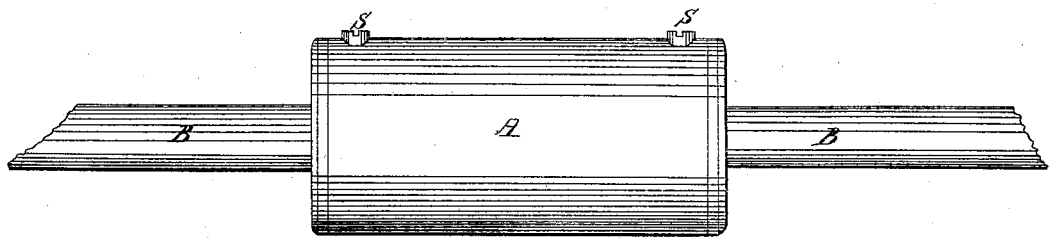
Figure 2:
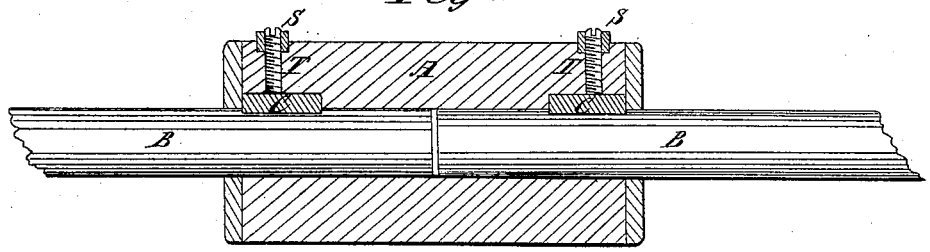
Figure 3:
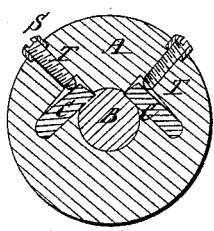

Figure 1 represents an outside view of my improved coupling. Fig. 2 represents a longitudinal section of the same. Fig. 3 is a cross-section, cut through the pawls.

All the drawings are lettered, and similar letters denote corresponding parts in the several views.

To construct a coupling in accordance with my plan I make a cast or wrought iron sleeve, A, in the usual manner, having a hole through it of the exact diameter of the shafts B B; but instead of securing the shafts therein in the ordinary way, by means of keys or screws, I accomplish the same purpose by placing two or more pawls, C C, in each end of the sleeve A, set at such an angle to a right line drawn across the axis of the shaft as to cause the inner ends of the pawls, when pressed by the screws T T passing from the outside of the sleeve, to rest upon and bite into the periphery of the shafts, thus preventing their rotation in either direction within the sleeve when in use.

The pinch-screws T T, extending from the outside of the sleeve A, may be held in place by jam-nuts S S.

I wish it understood that I do not limit my invention to the mere coupling-shafts, as it may be applied to securing pulleys, cones, and the like to shafting by inserting pawls in their hubs or bosses.

Having thus briefly described my invention, I claim—

The application and use of two or more pawls within a metallic sleeve arranged at such an angle to the axis of the shaft or shafts that one end of each pawl presses against and bites into the periphery of the shaft or shafts, so as to prevent their rotation in either direction within the sleeve when in use.

LYMAN GRAY.

Witnesses:
  JOSIAH W. ELLS,
  EB. WILLIAMS, Jr.